United States Patent [19]

Greene et al.

[11] 3,928,592

[45] Dec. 23, 1975

[54] ANTIBIOTIC PHARMACEUTICAL COMPOSITIONS

[75] Inventors: James M. Greene, Indianapolis; Joseph M. Indelicato, Greenwood, both of Ind.

[73] Assignee: Eli Lilly and Company, Indianapolis, Ind.

[22] Filed: Feb. 21, 1974

[21] Appl. No.: 444,622

[52] U.S. Cl. .............................................. 424/246
[51] Int. Cl.² ......................................... A61K 31/54
[58] Field of Search .................. 424/246; 260/243 C

[56] References Cited
UNITED STATES PATENTS 3,641,021  2/1972  Ryan ................................... 424/246
3,674,859  7/1972  Beutel et al ......................... 424/227

OTHER PUBLICATIONS

Chemical Abstracts 60:1548c (1964).
The Merck Index, 8th ed., Merck and Co., Inc., Rahway, N.J., 1968, p. 222.

*Primary Examiner*—Jerome D. Goldberg
*Attorney, Agent, or Firm*—William B. Scanlon; Everet F. Smith

[57] ABSTRACT

7-(D-2-Formyloxy-2-phenylacetamido)-3-(1-methyl-1H-tetrazole-5-ylthiomethyl)-3-cephem-4-carboxylic acid sodium salt, a pure, stable crystalline antibiotic compound, is formulated into parenteral pharmaceutical compositions in dosage unit form and is employed in treating bacterial infections.

2 Claims, No Drawings

ANTIBIOTIC PHARMACEUTICAL COMPOSITIONS

BACKGROUND OF THE INVENTION

This invention relates to antibiotic pharmaceutical compositions and to an antibiotic therapeutic method. In particular, this invention relates to antibiotic pharmaceutical compositions comprising as the active ingredient, 7-(D-2-formyloxy-2-phenylacetamido)-3-(1-methyl-1H-tetrazole-5-ylthiomethyl)-3-cephem-4-carboxylic acid sodium salt and to a therapeutic method for treating bacterial infections in warm blooded animals.

The cephalosporin antibiotic 7-D-mandelamido-3-methyl-1H-tetrazole-5-ylthiomethyl)-3-cephem-4-carboxylic acid, represented by the formula

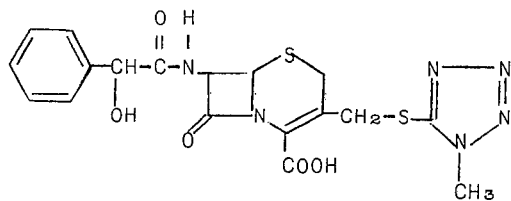

and the pharmaceutically acceptable salts thereof are described in U.S. Pat. No. 3,641,021 issued on Feb. 8, 1972. This highly efficacious antibiotic possesses a high order of activity against bacterial pathogens when administered parenterally to the infected host. This antibiotic, however, has been difficult to obtain consistently in the high state of purity and with the dry state stability properties required for use in pharmaceutical formulations. Accordingly, extensive effort has been devoted to the preparation of salts and derivatives of the antibiotic which would possess the desired state of purity and dry state stability and which would either retain the antibiotic activity of the parent antibiotic acid or afford the parent antibiotic acid on administration.

It has been found that the O-formyl derivative of the sodium salt of the antibiotic acid, namely, sodium (D-2-formyloxy-2-phenylacetamido)-3-(1-methyl-1H-tetrazole-5-ylthiomethyl)-3-cephem-4-carboxylate, can be prepared as a stable crystalline compound of high purity which is suitable for use in formulations for parenteral administration. This derivative is represented by the formula

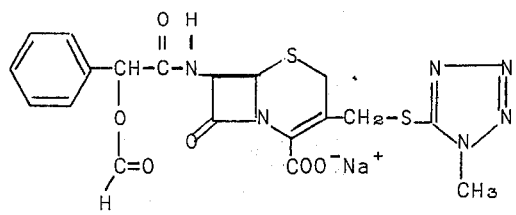

and has been previously described in U.S. Pat. No. 3,641,021 as an intermediate useful in the preparation of the aforementioned antibiotic. For convenience in naming, this antibiotic is also referred to herein as O-formyl antibiotic salt.

SUMMARY OF THE INVENTION

Sodium 7-(D-2-formyloxy-2-phenylacetamido)-3-(1-methyl-1H-tetrazole-5-ylthiomethyl)-3-cephem-4-carboxylate is prepared in a stable, crystalline form of high purity which is formulated with an alkali metal carbonate, preferably sodium carbonate, or with tris(hydroxymethyl)aminomethane (tris buffer) into unit dosage forms for parenteral administration.

DETAILED DESCRIPTION OF THE INVENTION

The pharmaceutical antibiotic compositions of this invention comprise as the active ingredient sodium 7-(D-2-formyloxy-2-phenylacetamido)-3-(1-methyl-1H-tetrazole-5-ylthiomethyl)-3-cephem-4-carboxylate. The antibiotic salt is obtained as a crystalline salt in the form of an anhydrate or a mono or dihydrate which is stable at 60°C. for at least 7 days in the dry state. The salt is highly soluble in water, readily forming 25 percent solutions in water at 25°C.

Whereas the crystalline salt is stable in the dry state, dilute aqueous solutions of the salt at a pH between pH 7 and 9 develop a slight deleterious turbidity which is associated with hydrolysis of the formate ester. Hydrolysis of the formate ester provides the sodium salt of 7-(D-2-hydroxy-2-phenylacetamido)-3-(1-methyl-1H-tetrazole-5-ylthiomethyl)-3-cephem-4-carboxylic acid and formic acid. With the formation of formic acid, the pH of the solution decreases and at the lowered pH the antibiotic salt is neutralized with some precipitation of the free acid form of the parent antibiotic, (D-2-hydroxy-2-phenylacetamido)-3-(1-methyl-1h-tetrazole-5-ylthiomethyl)-3-cephem-4-carboxylic acid.

The development of turbidity in aqueous solutions of the O-formyl antibiotic salt is undesirable and detracts from the pharmaceutical usefulness and elegance of such solutions.

According to the practice of this invention, the crystalline O-formyl antibiotic salt as the anhydrate or as the mono or dihydrate is formulated with between about 0.1 and 1.2 mole of a pharmaceutically pure alkali metal carbonate or tris(hydroxymethyl)aminomethane (tris buffer) per mole of O-formyl antibiotic salt. The sterile formulations when dissolved in sterile, deionized water afford clear, colorless solutions which remain free of turbidity for 48 hours at room temperature.

Alkali metal carbonates which can be used include potassium carbonate, lithium carbonate and, preferably, sodium carbonate. Sodium carbonate is preferred for use in the formulations of this invention.

As previously mentioned, the molar ratio of the alkali metal carbonate or tris buffer to the O-formyl antibiotic salt which may be employed varies from 0.1 to 1.2 mole. The preferred ratio is between about 0.275 to 1.0 mole of carbonate or tris buffer per mole of O-formyl antibiotic salt.

The formulations of this invention are best utilized in dosage unit form for parenteral administration. For example, the dry, sterile formulations can be filled into ampoules or rubber-stoppered vials in dosage unit forms having 250 mg., 500 mg., and 1,000 mg. of O-formyl antibiotic salt per unit. When used, water is added to the ampoule, for example 1 ml. of water is added, and the clear colorless antibiotic solution is withdrawn for intramuscular injection. Of more clinical importance, the dosage unit formulation can be dissolved in water and withdrawn, for example, in a hypodermic syringe, and can then be added to a large volume of a standard intravenous (I.V.) solution for administration. When thus diluted in a much larger volume of I.V. fluid, the formulations of this invention prevent the development of turbidity therein. In contrast, the dilution of a concentrated aqueous solution of O-formyl antibiotic salt in such I.V. solutions results in the development of unacceptable turbidity.

Standard I.V. solutions commonly employed clinically and with which the present formulationss are compatible include, for example, 5 percent dextrose U.S.P., isotonic saline (0.9 percent sodium chloride) U.S.P., electrolyte solution in 5 percent dextrose (Normisol-M, Abbott Laboratories) and like I.V. solutions.

The O-formyl antibiotic salt, the active ingredient in the formulations of the invention, is prepared in crystalline form in the following manner, D(−) mandelic acid is heated with excess 98 percent formic acid to formylate the hydroxyl group and provide O-formyl mandelic acid. The O-formyl derivative is then heated with excess thionyl chloride to form D-(−) O-formylmandeloyl chloride. The O-formylmandeloyl chloride product is then used to acylate 7-amino-3-(1-methyl-1H-tetrazol-5-ylthiomethyl)-3-cephem-4-carboxylic acid to provide 7-(D-2-formyloxy-2-phenylacetamido)-3-(1-methyl-1H-tetrazol-5-ylthiomethyl)-3-cephem-4-carboxylic acid. The acylation is carried out by first solubilizing the 7-amino-3-cephem nucleus acid in an inert solvent such as ethyl acetate by reacting the nucleus in suspension with a silylating agent such as monosilylacetamide (MSA). The silylated 71-amino-3-cephem nucleus in solution is acylated with the O-formylmandeloyl chloride at about 20–25°C. and thereafter the reaction mixture is treated with water to provide the product, 7-(D-2-formyloxy-2-phenylacetamido)-3-(1-methyl-1H-tetrazol-5-ylthiomethyl)-3-cephem-4-carboxylic acid.

The O-formyl antibiotic acid is converted to the crystalline sodium salt in dry acetone with sodium 2-ethylhexanoate. The crystalline salt precipitates from the acetone solution on cooling with seeding. The salt is filtered and is vacuum dried at about 40°C. overnight to provide the salt in crystalline form suitable for pharmaceutical use. The foregoing preparation is outlined in the following general reaction scheme.

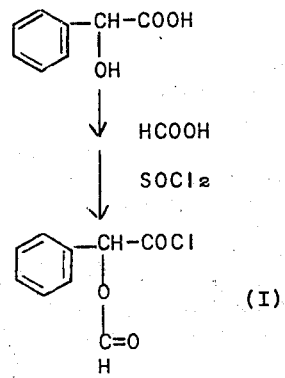

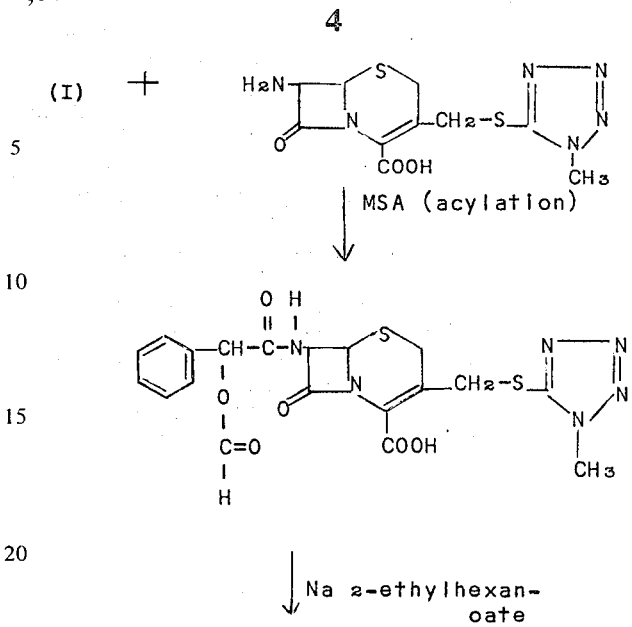

Crystalline Antibiotic Sodium Salt

The crystalline sodium salt after drying is passed through a screen to obtain uniform crystalline particle size prior to formulation. The screened O-formyl antibiotic salt is then blended with the alkali metal carbonate or tris buffer in a mechanical blender to provide the bulk O-formyl antibiotic salt-carbonate or tris buffer dry formulation.

The bulk formulation is then metered into glass ampoules or rubber-stoppered vials to provide the dosage unit forms for administration.

Preferred dosage unit formulations contain the preferred alkali metal carbonate, sodium carbonate, at a concentration of between 5.0 and 6.0 percent by weight of O-formyl antibiotic salt active ingredient. For example, the following dosage unit formulations are preferred.

| Weight of Active Ingredient (mg.) | Weight of $Na_2CO_3$ (mg.) |
|---|---|
| 1000 | 54 |
| 500 | 30 |
| 250 | 14 |

Although the foregoing percentages of sodium carbonate in the dosage unit forms are preferred, an amount in excess of 6 percent by weight of active ingredient can be used to achieve suitable formulations which will prevent turbidity when diluted in I.V. solutions. However, in clinical practice it is oftentimes desirable to keep the sodium ion concentration at a minimum and, accordingly, large excesses of sodium carbonate in the formulations are to be avoided.

The preferred formulations of O-formyl antibiotic salt and sodium carbonate when dissolved in water have an initial pH of about 8.9 which rapidly decreases to pH 6.5–7.0. The pH of the solution then remains constant for several hours.

The dry formulations of the O-formyl antibiotic salt provide a buffered environment for the O-formyl antibiotic salt in dilute aqueous solutions which prevents the development of turbidity attributable to the hydrolysis of the O-formyl group. Thus, when diluted in an I.V. solution, any parent antibiotic acid, 7-D-mandelamido-3-(1-methyl-1H-tetrazole-5-ylthiomethyl)-3-cephem-4-carboxylic acid, which is formed by the hydrolysis of the O-formyl group remains in solution.

As mentioned above, 7-(D-2-formyloxy-2-phenylacetamido)-3-(1-methyl-1H-tetrazole-5-ylthiomethyl)-3-cephem-4-carboxylic acid, has been previously described by Ryan in U.S. Pat. No. 3,641,021 as an intermediate useful in the preparation of 7-(D-mandelamido)-3-(1-methyl-1H-tetrazole-5-ylthiomethyl)-3-cephem-4-carboxylic acid, one of the novel antibiotics described therein. Although it is known that the O-formyl ester group of O-formyl antibiotic salt can be hydrolyzed to provide the antibiotic described by Ryan, the O-formyl antibiotic salt itself when tested in vitro inhibits the growth of a wide spectrum of microorganisms. In Table I below are listed the minimum inhibitory concentrations (MIC) of the O-formyl antibiotic salt against a variety of gram-positive and gram-negative bacteria and fungi. The MIC values were obtained by the standard agar dilution test.

TABLE I

Antimicrobial Spectrum of Sodium
7-(D-2-Formyloxy-2-phenylacetamido)-3-(1-methyl-1H-tetrazole-5-ylthiomethyl)-3-cephem-4-carboxylate

| Test Organism* | Minimum Inhibitory Concentration (mcg./ml.) |
|---|---|
| Staphylococcus aureus 3055 | <0.5 |
| Staphylococcus aureus 3074 | <0.5 |
| Streptococcus faecalis X66 | 4 |
| Proteus morganii PR15 | 4 |
| Salmonella typhosa SA12 | <0.5 |
| Klebsiella pneumoniae K214 | 2 |
| Enterobacter aerogenes EB17 | 8 |
| Serratia marcescens SE3 | >128 |
| Escherichia coli EC14 | 2 |
| Citrobacter freundii CF17 | >128 |
| Pseudomonas aeroginosa X239 | >128 |
| Bordetella bronchiseptica 16 | 16 |
| Salmonella typhimurium | >128 |
| Pseudomonas solanacearum X185 | 32 |
| Candida tropicalis A17 | >128 |
| Trichophyton mentagrophytes 27 | >128 |
| Aspergillus flavus E | >128 |
| Ceratocystis ulmi | 32 |

*Numerals and letters following the names of the test microorganisms refer to strains.

In further testing, O-formyl antibiotic salt was effective in inhibiting the growth of selected bacterial clinical isolates in the agar dilution test. In Table II which follows, the MIC values exhibited by O-formyl antibiotic salt against various clinical isolates of *Klebsiella pneumoniae* are listed.

TABLE II

Sodium
7-(D-2-Formyloxy-2-phenylacetamido)-3-(1-methyl-1H-tetrazole-5-ylthiomethyl)-3-cephem-4-carboxylate Activity vs. *Klebsiella pneumoniae*

| Test Organism* | Minimum Inhibitory Concentration (mcg./ml.) |
|---|---|
| Klebsiella pneumoniae K213 | 0.5 |
| Klebsiella pneumoniae K214 | 0.5 |
| Klebsiella pneumoniae K215 | 0.25 |
| Klebsiella pneumoniae K216 | 1.0 |
| Klebsiella pneumoniae K220 | 2.0 |
| Klebsiella pneumoniae K222 | 0.5 |
| Klebsiella pneumoniae K225 | 1.0 |
| Klebsiella pneumoniae K226 | 4.0 |
| Klebsiella pneumoniae K227 | 4.0 |
| Klebsiella pneumoniae K23 | 0.25 |

*Lettered numbers refer to particular strains.

TABLE III

Sodium
7-(D-2-Formyloxy-2-phenylacetamido)-3-(1-methyl-1H-tetrazole-5-ylthiomethyl)-3-cephem-4-carboxylate Activity vs. *Proteus* sp.

| Test Organism | Minimum Inhibitory Concentration (mcg./ml.) |
|---|---|
| Proteus morganii PR1 | 0.5 |
| Proteus morganii PR15 | 0.5 |
| Proteus rettgeri PR2 | 4.0 |
| Proteus rettgeri PR7 | 0.13 |
| Proteus rettgeri PR9 | 2.0 |
| Proteus vulgaris PR27 | 2.0 |
| Proteus vulgaris PR23 | 1.0 |
| Proteus mirabilis PR3 | 2 |
| Proteus mirabilis PR4 | 0.5 |
| Proteus mirabilis PR5 | 1.0 |
| Proteus mirabilis PR6 | 1.0 |
| Proteus mirabilis PR8 | 1.0 |
| Proteus mirabilis PR10 | 2.0 |
| Proteus mirabilis PR29 | 0.5 |

In Table IV, the MIC values aganist clinical isolates of *Escherichia coli* are listed.

TABLE IV

Sodium
7-(D-2-Formyloxy-2-phenylacetamido)-3-(1-methyl-1H-tetrazole-5-ylthiomethyl)-3-cephem-4-carboxylate Activity vs. *Escherichia coli*

| Test Organism | Minimum Inhibitory Concentration (mcg./ml.) |
|---|---|
| Escherichia coli EC6 | 2 |
| Escherichia coli EC14 | 0.25 |
| Escherichia coli EC20 | 0.5 |
| Escherichia coli EC31 | 1.0 |
| Escherichia coli EC39 | 16 |
| Escherichia coli EC50 | 0.25 |

O-Formyl antibiotic salt is also active in inhibiting the growth of penicillin-resistant strains of Staphylococcus. For example, against the methicillin-resistant strain *S. aureus* 3130, it had an MIC value of 0.13 mcg./ml.

When administered subcutaneously to mice infected with *Streptococcus pyogenes* C203, O-formyl antibiotic salt has an $ED_{50}$ of >0.8 mg./kg.×2. With *Escherichia coli* EC14 infected mice, the $ED_{50}$ is >8.3 mg./kg.×2.

In view of the lability of the O-formyl ester towards hydrolysis, it is possible that at least some of the antibiotic activity displayed in vitro and in vivo can be attributed to sodium 7-(D-mandelamido)-3-(1-methyl-1H-tetrazole-5-ylthiomethyl)-3-cephem-4-carboxylate arising either by chemical or enzymatic hydrolysis of the O-formyl ester group in the side chain of O-formyl antibiotic salt. Such possibility is evidenced by the formation of the hydrolysis product during chromatography of the O-formyl antibiotic salt. One spot located on the chromatogram corresponds to the location of the 7-(D-mandelamido)-3-cephem antibiotic run in an adjacent lane on the same chromatogram. Likewise, chromatograms run on blood samples withdrawn at various time intervals from mice injected with O-formyl antibiotic salt indicate that at about 15–20 min. post injection, substantial levels of the 7-(D-mandelamido)-3-cephem antibiotic were present in the sample. Regardless of whether or not the antibiotic activity demonstrated by the O-formyl antibiotic salt is attributable to the known antibiotic 7-(D-mandelamido)-3-(1-methyl-1H-tetrazole-5-ylthiomethyl)-3-cephem-4-carboxylic acid, the O-formyl derivative thereof is unique in that it can be obtained as a pure, stable crystalline compound suitable for use in the dosage unit formulations of this invention. Accordingly, the O-formyl antibiotic salt provides an attractive alternative to the known antibiotic.

This invention further provides a method for combatting bacterial infections in warm blooded mammals which comprises administering parenterally to warm blooded mammals a therapeutically effective amount of the O-formyl antibiotic salt. The antibiotic can be administered intramuscularly by injection of a sterile aqueous antibiotic solution or by the intravenous route whereby the antibiotic is in solution in a standard I.V. solution. The O-formyl antibiotic salt is administered to the human or animal bacterial host in a non-toxic therapeutically effective dose of from about 50 to 1000 mg. per kg. of body weight. The unit dosage formulations previously described are desirable preparations of the antibiotic which are readily employed in the present method.

As with most methods of treatment the dose may vary depending on such conditions as the nature and severity of the infection, the condition of the patient, and the response achieved with the individual. The O-formyl antibiotic salt may be administered by i.m. injection three to four times daily or it can be administered over a longer period throughout the day by I.V. drip.

The following examples are provided to illustrate the preparation of the crystalline O-formyl antibiotic salt and the formulations in which it comprises the active ingredient.

EXAMPLE 1

Preparation of Sodium 7-(D-2-formyloxy-2-phenylacetamido)-3-(1-methyl-1H-tetrazole-5-ylthiomethyl)-3-cephem-4-carboxylate To 21.6 kg. (17.8 l.) of 98 percent formic acid was added 1.14 kg. (7.5 M) of D-(−)-mandelic acid and the reaction mixture was heated for 4 hours at 70°C. with stirring. The excess formic acid was evaporated off in vacuo and the residual syrup was dissolved in 6 l. of benzene. The solution was washed twice with 6 l. portions of water and was dried over magnesium sulfate. The drying agent was filtered and washed with 1.5 l. of benzene, the washes being added to the filtrate. The dried filtrate was evaporated in vacuo to obtain the D-(−)-mandelic acid formate ether as a syrup. The product can be crystallized from cyclohexane to yield material melting at about 55°–58°C.

The mandelic acid formate ester obtained as a syrup as described above is stirred for 2 hrs. with 2.9 kg. (ca. 1.75 l.) of thionyl chloride at a temperature of about 70°C. The excess thionyl chloride is removed by evaporation and the residual green solution is vacuum distilled. The product, O-formyl mandeloyl chloride, distills over at 127°–130°C. (15 mm.) or at 108°–112°C. (7 mm.).

Specific rotation $[\alpha]_D^{25°}$ − 175°

Elemental Analysis for $C_9H_7ClO_3$: Calculated: C, 54.42; H, 3.55; Cl, 17.85; Found: C, 54.17; H, 3.48; Cl, 17.95

To 13 l, of ethyl acetate were added 851.1 g. (2.59 M) of 7-amino-3-(1-methyl-1H-tetrazole-5-ylthiomethyl)-3-cephem-4-carboxylic acid and 1,361 g. (10.37 M) of mono-trimethylsilyl acetamide, and the mixture was stirred at 50°C. until a clear solution was obtained. The solution was cooled to 20°C. and 514 g. (2.59 M) of O-formyl mandeloyl chloride was added at a rate such that the temperature of the reaction solution was maintained between about 20°–25°C. with ice-cooling. The reaction mixture was stirred for 1.5 hours at about room temperature after the addition of the mandeloyl chloride was completed. Five liters of water were then added to the reaction mixture and the diluted mixture was stirred for about 10 minutes. The organic layer was separated and was washed twice with water. The combined washes are extracted with 1.5 l. of ethyl acetate and the extract is combined with the washed organic layer. The whole was dried over magnesium sulfate, filtered and evaporated in vacuo on a 25°C. water bath to yield 1,460 g. of product, 7-(D-2-formyloxy-2-phenylacetamido)-3-(1-methyl-1H-tetrazole-5-ylthiomethyl)-3-cephem-4-carboxylic acid, as a yellow foam.

The product was dissolved in 5 l. of acetone and the solution was mixed with a solution of 430 g. (2.59 M) of sodium 2-ethylhexanoate in 5.4 l. of acetone. The combined solutions were seeded and stirred in an ice bath for 1.5 hours. The crystalline precipitate of sodium 7-(D-2-formyloxy-2-phenylacetamid-3-(1-methyl-1H-tetrazole-5-ylthiomethyl-3-cephem-4-carboxylate was filtered and washed with 5 l. of acetone. The crystalline salt was dried overnight in a vacuum oven at 40°C. to yield 1,060 g. (80 percent) of product melting at about 182°–184°C. U.V. absorption: $E_{1\ cm}^{1\%}$ (ethanol) 208. Nuclear magnetic resonance spectrum: ($D_2O$) δ3.40 (d, 2H); δ3.94 (s, tetrazole 1-methyl group); δ4.15 (s, —$CH_2$—S); δ4.94 (d, 6H); δ5.63 (d, 7H); δ6.20 (s, benzylic H); δ7.40 (m, $C_6H_5$); δ8.25 (s, CHO) and δ8.87 (d, NH).

EXAMPLE 2

Preparation of Dosage Unit Formulations—Sodium Carbonate—O-Formyl Antibiotic Salt One kilogram of the dry sodium 7-(D-2-formyloxy-2-phenylacetamido)-3-(1-methyl-1H-tetrazole-5-ylthiomethyl)-3-cephem-4-carboxylate was passed through a 60–100 mesh sieve (U.S. screen size) and blended with 54 grams of sodium carbonate in a mechanical stainless steel blender.

The blended formulation is then metered into sterile vials in an amount to provide the required dosage unit per vial.

EXAMPLE 3

Preparation of Tris (hydroxymethyl)aminomethane O-Formyl Antibiotic Salt Dosage Unit Formulations One kilogram of the dry anhydrate crystalline form of sodium 7-(D-2-formyloxy-2-phenylacetamido)-3-(1-methyl-1H-tetrazole-5-ylthiomethyl)-3-cephem-4-carboxylate is passed through a 60–100 mesh sieve (U.S. screen size) and thoroughly blended with 237 grams of tris (hydroxymethyl)aminomethane in a mechanical blender. The tris buffer is passed through a 50 mesh sieve prior to blending with the antibiotic. The blended, dry formulation is then metered into sterile vials to provide the required dosage unit per vial.

We claim:

1. An antibiotic pharmaceutical composition in dosage unit form comprising a therapeutically effective amount of between about 50 mg. and 1000 mg. per dosage unit of sodium 7-(D-2-formyloxy-2-phenylacetamido)-3-(1-methyl-1H-tetrazole-5-ylthiomethyl)-3-cephem-4-carboxylate in admixture with between about 5 and 6 percent by weight of sodium carbonate or potassium carbonate.

2. The antibiotic pharmaceutical composition of claim 1 wherein the antibiotic ingredient is admixed with between about 5 and 6 percent by weight of sodium carbonate.

* * * * *

UNITED STATES PATENT AND TRADEMARK OFFICE
CERTIFICATE OF CORRECTION

PATENT NO. : 3,928,592
DATED : December 23, 1975
INVENTOR(S) : James M. Greene and Joseph M. Indelicato It is certified that error appears in the above–identified patent and that said Letters Patent are hereby corrected as shown below:

In column 1, line 46, "(D-2-formyloxy-" should read -- 7-(D-2-formyloxy- --.

In column 2, line 38, "(D-2-hydroxy-2-phenylacetamido)-3-(1-methyl-1h-tet-" should read -- 7-(D-2-hydroxy-2-phenylacetamido)-3-(1-methyl-1H-tet- --.

In column 3, line 17, "formulationss" should read -- formulations --.

In column 3, line 25, remove the "," after "manner" and insert a period.

In column 3, line 39, "The silylated 71-amino-3-" should read -- The silylated 7-amino-3- --.

In column 6, line 12, insert the following paragraph before "TABLE III": -- In Table III the MIC values against clinical isolates of _Proteus_ sp. are listed. --

In column 8, line 4, "13 1," should read -- 13 1. --.

In column 8, line 33, "phenylacetamid-3-(1-" should read -- phenylacetamido-3-(1- --.

In column 8, line 39, "$E_1^{1\ \%}\ cm$" should read -- $E_1^{1\%}\ cm$ --.

Signed and Sealed this

Seventh Day of September 1976

[SEAL]

Attest:

RUTH C. MASON
Attesting Officer

C. MARSHALL DANN
Commissioner of Patents and Trademarks